No. 813,446. PATENTED FEB. 27, 1906.
E. F. PIPER.
GANG PLOW.
APPLICATION FILED APR. 29, 1905.

2 SHEETS—SHEET 2.

Witnesses.
A. H. Opsahl.
E. W. Jeppesen.

Inventor.
Edmund F. Piper.
By his Attorneys.
Williamson Mucklow

UNITED STATES PATENT OFFICE.

EDMUND F. PIPER, OF FARGO, NORTH DAKOTA.

GANG-PLOW.

No. 813,446.   Specification of Letters Patent.   Patented Feb. 27, 1906.

Application filed April 29, 1905. Serial No. 258,006.

*To all whom it may concern:*

Be it known that I, EDMUND F. PIPER, a citizen of the United States, residing at Fargo, in the county of Cass and State of North Dakota, have invented certain new and useful Improvements in Gang-Plows; and I do hereby declare the following to be a full, clear, and exact description of the invention, such as will enable others skilled in the art to which it appertains to make and use the same.

My invention relates to gang-plows, and has for its object to improve the same in point of simplicity, efficiency, and ease of manipulation.

To the above ends my invention consists of the novel device and combination of devices hereinafter described, and defined in the claims.

In the accompanying drawings is illustrated my invention, like characters indicating like parts throughout both views.

Figure 1:
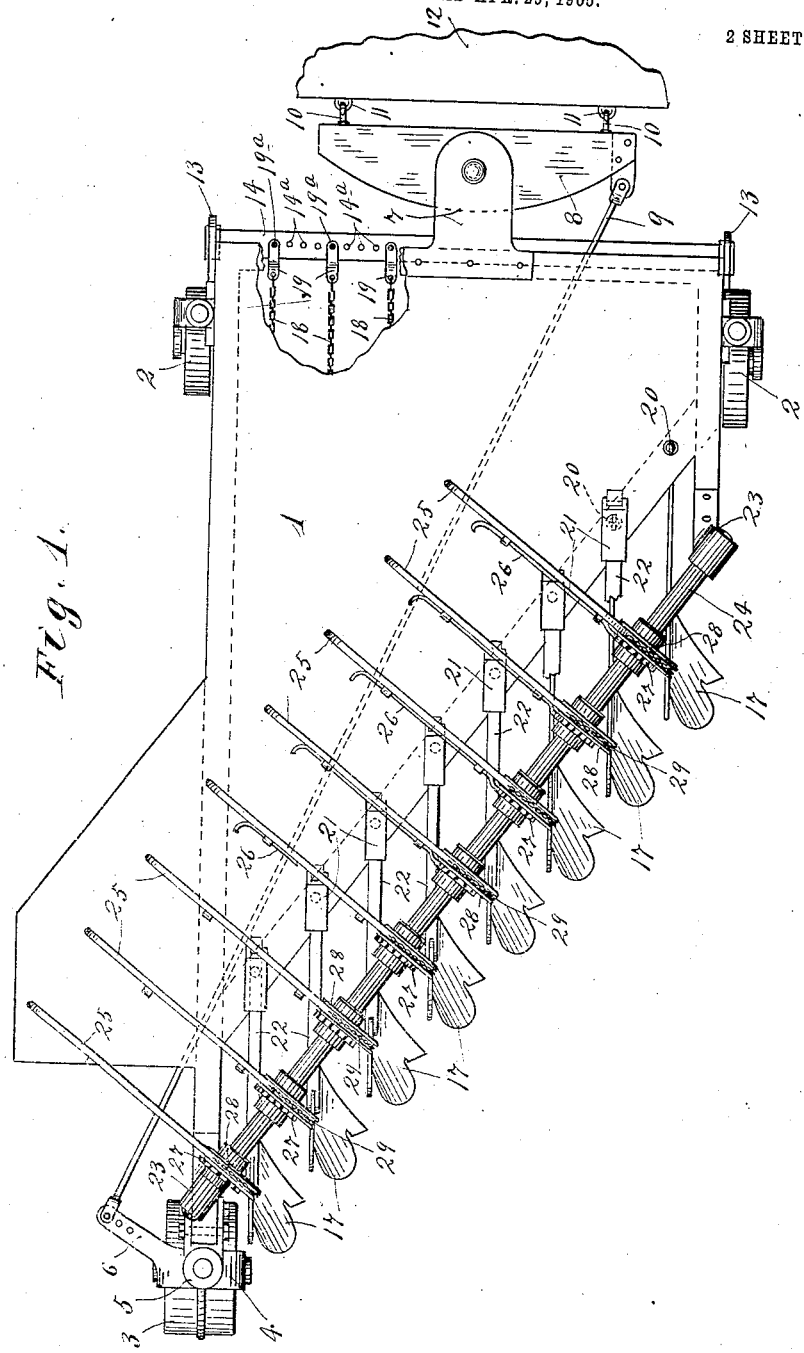
Figure 2:
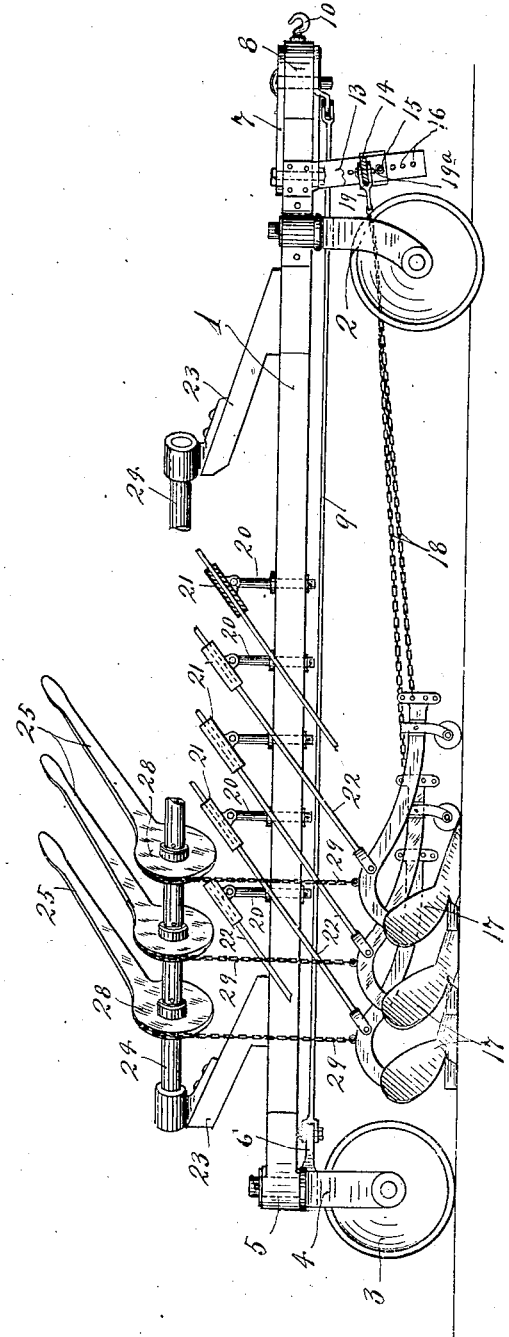

Figure 1 is a plan view showing the improved plow; and Fig. 2 is a side elevation with some parts broken away, showing the plow illustrated in Fig. 1.

The numeral 1 indicates an approximately triangular truck-frame, the side and forward portions of which are supported by a pair of caster-wheels 2, and a rear side portion of which is supported by a steering-wheel 3, mounted in a fork 4, which is journaled in a bearing 5 on said platform 1 and is provided with a laterally-projecting arm 6.

At the forward central portion of the truck-frame 1 is a pronged coupling-bracket 7, to which is pivoted a draft-beam 8. One end of this pivoted draft-beam 8 is connected to the arm 6 of the wheel-yoke 4 by a long diagonally-extended rod 9.

This gang-plow is especially designed and intended to be drawn by a traction-engine, and, as shown, the beam 8 is provided at its ends with hooks 10, which are coupled to links 11 on the rear portion of the frame 12 of the traction-engine, which frame is indicated only in part and in diagram in Fig. 1. By means of the steering connections just described the steering-wheel 3 will be oscillated in the proper direction to cause the truck to turn curves and follow in the path of the traction-engine.

Rigidly secured to and depended from the forward portion of the truck-frame 1, at the sides thereof, is a pair of laterally-spaced legs 13, that terminate a considerable distance above the ground. Extending transversely of the machine and rigidly but adjustably secured to the legs 13 is a drag-bar 14, the ends of which, as shown, are adjustably secured to said legs by bolts or pins 15, passed therethrough and through perforations 16 in said legs.

The plows 17 are arranged in a transversely-spaced series located successively one at the rear of the other from left side toward the right side of the machine. These plows 17 are independently connected by chains 18 or similar connection to the transverse bar 14. The said bar 14 is provided with closely-spaced perforations $14^a$, and said chains 18 at their forward ends are provided with bifurcated coupling-links 19, through which said perforations $14^a$ pins or bolts $19^a$ are passed to adjustably secure the said plow connections to the drag-bar 14. The several plows are independently held in upright operative positions by novel devices which permit said plows to freely move laterally to adapt themselves to the proper cut or width of furrow and to move vertically into and out of operative positions. Each such device comprises a short vertical post or pedestal 20, which is swiveled in the truck-frame 1 and to the upper end of which is pivoted an elongated head 21. These heads 21 are free for pivotal movements in a vertical plane and are provided with longitudinal perforations through which long bars or rods 22 freely telescope. The bars 22 at their lower rearwardly-projecting ends are pivotally attached one to each plow-beam.

Secured at its ends to brackets 23 on the truck-frame 1 and extending diagonally of the machine over the rear portions of the plow is a long rod or shaft 24, upon which is mounted a plurality of lifting-levers 25. One of these lifting-levers 25 is provided for each plow, and each lever has a latch 26, that cooperates with the notched disk 27, rigidly secured on the fixed shaft 24, and at their pivoted ends the levers 25 are provided with sheaves 28. To each plow-beam is attached a lifting-chain 29, the upper end of which runs upon and is attached to sheave 28 of the corresponding lifting-lever 25. By means of the lifting levers and connections described it is evident that the plows may be independently raised and lowered and that the said plows are free for all those movements which are necessary in the plowing action and that the said plows by means of the steadying bars or rods 22 and connections are held upright—that is, are prevented from tilting over or rocking out of their proper operative positions. It is also evident that the depth of cut which the plows will make may be regulated by vertical adjustments of the dragbar 14.

The plows described are extremely simple, are efficient for representing the view, and may be very easily manipulated. The said plows are of course capable of modifications within the scope of my invention as herein set forth and claimed.

What I claim, and desire to secure by Letters Patent of the United States, is as follows:

1. The combination with a truck, of a plow loosely attached to the truck-frame by a drag connection, and a second loose connection to said plow and to said truck-frame, arranged to permit only lateral and vertical movements of the plow, but to positively hold the same always in an upright position, substantially as described.

2. The combination with a truck and a plow loosely connected thereto, of a bar or rod pivoted to the plow-beam, with freedom for pivotal movements in the vertical plane of said beam, and a pivoted support on the truck-frame, through which the upper end of such bar works telescopically, thereby holding said plow in upright position, substantially as described.

3. The combination with a truck and a plow, of a drag connection, attaching said plow to the forward portion of the truck-frame, with freedom for vertical and lateral movements, of a device for holding said plow in an upright position, while permitting said movements, said device comprising an upright pedestal swiveled to the truck-frame, a head pivoted to said pedestal for movements in a vertical plane, and a bar or rod pivoted to the plow-beam, for movements in a vertical plane, and at its upper end working telescopically through said pivoted head, substantially as described.

4. In a gang-plow, the combination with a truck having an approximately triangular truck-frame, a transversely-extended drag-bar secured to the forward portion of the truck-frame, a plurality of plows arranged in a diagonally laterally spaced row, chains independently connecting said plows to said drag-bars, a fixed shaft on said truck-frame, overlying said plows and provided with fixed notched disks, levers mounted on said fixed shaft adjacent to said notched disks and provided with latches coöperating therewith, chains connecting said plows to the overlying lever, and independent devices applied to said plows and to the truck-frames, for positively holding said plows in upright positions and permitting only lateral and vertical movements of said plows, substantially as described.

In testimony whereof I affix my signature in presence of two witnesses.

EDMUND F. PIPER.

Witnesses:
ALICE R. BLAIR,
V. R. LOVELL.